United States Patent Office 2,727,886
Patented Dec. 20, 1955

2,727,886
DISAZO DYESTUFFS

Philippe Grandjean, Basel, Switzerland, assignor to Sandoz A. G., Basel, Switzerland, a Swiss firm No Drawing. Application March 31, 1952,
Serial No. 279,691

Claims priority, application Switzerland April 27, 1951

6 Claims. (Cl. 260—160)

The present invention relates to disazo dyestuffs and a primary object of it is the embodiment of dyestuff derivatives, characterized inter alia by good dischargeability.

This object, and others which will be readily apparent, is realized, according to the present invention, by the new group of dyestuffs corresponding to the formula

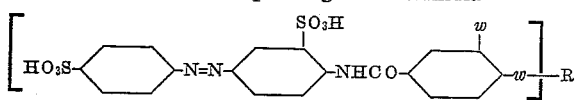

(1)

wherein one $w$ is an —N=N— group and the other $w$ is a hydrogen atom, a halogen atom, a lower alkyl group or a lower alkoxy group, and R is one of the following radicals:

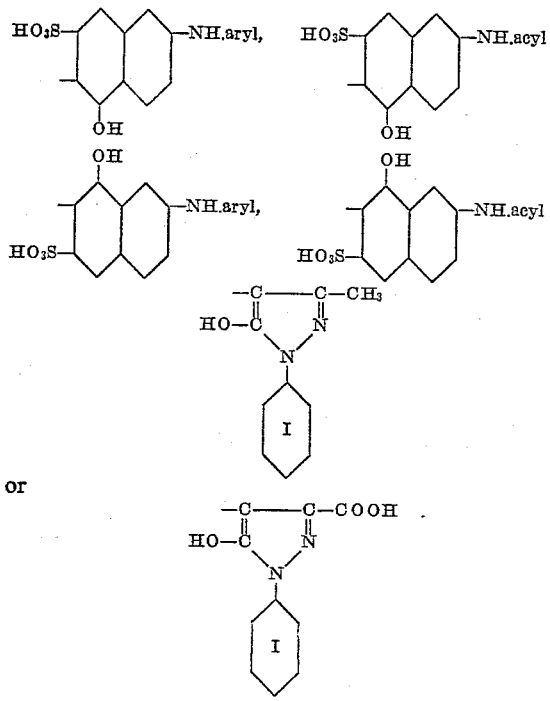

(2)

the nuclei I being substituted or unsubstituted.

The new dyestuffs of Formula 1 are prepared by coupling the diazo compound from a corresponding aminobenzoylaminoazo dyestuff of the formula

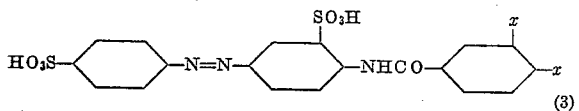

(3)

wherein one $x$ is an amino group and the other $x$ is a hydrogen atom, a halogen atom, a lower alkyl group or a lower alkoxy group, with the appropriate N-aryl or N-acyl derivative of 2-amino-5-hydroxynaphthalene-7-sulfonic acid, 2-amino-8-hydroxynaphthalene-6-sulfonic acid, 1-phenyl-3-methyl-5-pyrazolone or 1-phenyl-5-pyrazolone-3-carboxylic acid, the phenyl nucleus of the last two-named compounds being unsubstituted or substituted.

The new dyestuffs dye cotton and regenerated cellulose fibers in yellow, orange, red or red-brown shades which are distinguished by their generally very pure and brilliant shade, their good fastness to light and their excellent dischargeability.

The aminobenzoylaminoazo dyestuffs of Formula 3, which serve as starting products, are obtained by condensing 4'-amino-1,1'-azobenzene-4,3'-disulfonic acid with a nitrobenzoyl halide of the formula

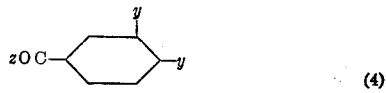

(4)

wherein $z$ is a halogen atom, one $y$ is a nitro group and the other $y$ is a hydrogen atom, a halogen atom, a lower alkyl group or a lower alkoxy group, and then converting the nitro group of the resultant condensation product into the amino group.

Illustrative of nitrobenzoyl halides of Formula 4, which can be used for the preparation of the aminobenzoylaminoazo dyestuffs of Formula 3 are for example: 3-nitrobenzoyl chloride, 4-nitrobenzoyl chloride, 4-nitro-3-methylbenzoyl chloride, 3-nitro-4-methylbenzoyl chloride, 4-nitro-3-methoxybenzoyl chloride, 4-nitro-3-ethoxybenzoyl chloride, 3-nitro-4-methoxybenzoylchloride, 3-nitro-4-ethoxybenzoyl chloride, 4-nitro-3-chlorobenzoyl chloride, 4-nitro-3-bromobenzoyl chloride, 3-nitro-4-chlorobenzoyl chloride, 3-nitro-4-bromobenzoyl chloride and the corresponding bromides.

Of the numerous coupling components which are suitable for the preparation of the end dyestuffs, the following are illustrative (they correspond to "R" in Formula 1):

2-formylamino-5-hydroxynaphthalene-7-sulfonic acid,
2-acetylamino-5-hydroxynaphthalene-7-sulfonic acid,
2-chloroacetylamino - 5 - hydroxynaphthalene -7 -sulfonic acid,
2-propionylamino-5-hydroxynaphalene-7-sulfonic acid,
2-butyrylamino-5-hydroxynaphthalene-7-sulfonic acid,
2-formyl- and acetyl-amino-8-hydroxynaphthalene-6-sulfonic acid,
2-propionyl- and butyryl-amino-8-hydroxynaphthalene-6-sulfonic acid,
2-benzoylamino-5-hydroxynaphthalene-7-sulfonic acid,
2-benzoylamino-8-hydroxynaphthalene-6-sulfonic acid,
2-(3'- aminobenzoylamino)- 5-hydroxynaphthalene-7-sulfonic acid,
2-(3'- aminobenzoylamino)- 8-hydroxynaphthalene-6-sulfonic acid,
2-(4'- aminobenzoylamino)- 5-hydroxynaphthalene-7-sulfonic acid,
2-(4'- aminobenzoylamino)- 8-hydroxynaphthalene-6-sulfonic acid,
2 - [3' - (3" - aminobenzoylamino) - benzoylamino]-5-hydroxynaphthalene-7-sulfonic acid,
2 - (3' - methyl - 4' - aminobenzoylamino) - 5 - hydroxynaphthalene-7-sulfonic acid,
2 - (4' - methoxy - 3' - aminobenzoylamino) - 5 - hydroxynaphthalene-7-sulfonic acid,
2 - (3' - chloro - 4' - aminobenzoylamino) - 5 - hydroxynaphthalene-7-sulfonic acid,
2-cinnamoylamino-5-hydroxynaphthalene-7-sulfonic acid,
2-cinnamoylamino-8-hydroxynaphthalene-6-sulfonic acid,
5,5'-dihydroxy-2,2'-dinaphthylamine-7,7'-disulfonic acid,
2-phenylamino-5-hydroxynaphthalene-7-sulfonic acid,
2 - (4' - methoxyphenylamino) - 5 - hydroxynaphthalene-7-sulfonic acid,
2-phenylamino-8-hydroxynaphthalene-6-sulfonic acid,
2 - (4' - methoxyphenylamino) - 8 - hydroxynaphthalene-6-sulfonic acid, 1-phenyl-3-methyl-5-pyrazolone,
1-(4'-aminophenyl)-3-methyl-5-pyrazolone,
1-(4'-hydroxy-3'-carboxyphenyl)-3-methyl-5-pyrazolone,
1 - [3' - (3" - aminobenzoylamino) - phenyl] - 3 - methyl-5-pyrazolone,
1-(4'-sulfophenyl)-3-methyl-5-pyrazolone,
1-phenyl-5-pyrazolone-3-carboxylic acid,
1-(3'-aminophenyl)-5-pyrazolone-3-carboxylic acid,
1 - [3' - (3" - aminobenzoylamino) - phenyl] - 5 - pyrazolone-3-carboxylic acid,
1 - [3' - (4" - methoxy - 3" - aminobenzoylamino)-phenyl]-5-pyrazolone-3-carboxylic acid.

When the coupling component contains a free amino group, the disazo dyestuff prepared therefrom can be diazotized and coupled, on the fiber or in substance, with a suitable component, such as 2-hydroxynaphthalene and 1-phenyl-3-methyl-5-pyrazolone. This after treatment increases the fastness to washing of dyeings prepared with the products.

The following examples set forth representative exemplary embodiments of the invention, and these examples are intended to be solely illustrative and not at all limitative. In these examples, the parts and percentages are by weight and the temperatures are expressed in degrees centigrade.

*Example 1*

47.6 parts of 4'-(4"-aminobenzoylamino)-1,1'-azobenzene-4,3'-disulfonic acid are dissolved in 250 parts of water, with addition of sodium hydroxide, and then 7 parts of sodium nitrite added. The solution is slowly added to a mixture of 45 parts of hydrochloric acid of 30% strength and 100 parts of ice in such manner that the final temperature of the mixture is within the range 5–10°. Upon completion of the diazotization, which requires about 3 hours, the diazo suspension is allowed to run, within a period of 30 minutes, into a neutral solution of 34.3 parts of 2-benzoylamino-5-hydroxynaphthalene-7-sulfonic acid. At the same time, so much sodium bicarbonate is added that the pH-value of the solution is constantly between 6.5 and 7.0 Coupling takes place very rapidly; the solution containing the completely dissolved resultant disazo dyestuff is then heated to 70°, the dyestuff salted out, filtered off and dried.

The new dyestuff corresponds to the formula

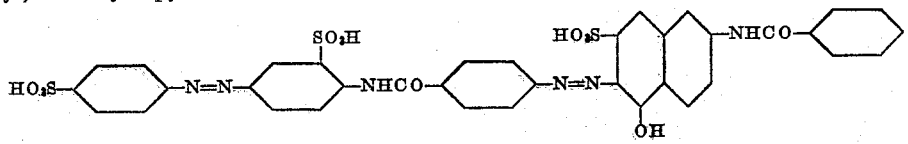

and is an orange-red powder which dissolves in water with an orange coloration and in concentrated sulfuric acid with red coloration. It dyes cotton and fibers of regenerated cellulose in bright red-orange shades, which are of very good fastness to light and dischargeability.

Similar dyestuffs are obtained when, while otherwise proceeding as set forth in this example, the 2-benzoylamino-5-hydroxynaphthalene-7-sulfonic acid is replaced by an equivalent quantity of 2-benzoylamino-8-hydroxynaphthalene-6-sulfonic acid or of 2-formylamino-5-hydroxynaphthalene-7-sulfonic acid or of 2-acetylamino-5-hydroxynaphthalene-7-sulfonic acid or of 2-propionylamino-5-hydroxynaphthalene-7-sulfonic acid or of 2-cinnamoylamino-5-hydroxynaphthalene-7-sulfonic acid. Likewise, dyestuffs with similar properties are obtained when, while otherwise proceeding as hereinbefore described, the 4'-(4"-aminobenzoylamino)-1,1'-azobenzene-4,3'-disulfonic acid is replaced by an equivalent quantity of (a) 4' - (3" - aminobenzoylamino) - 1,1' - azobenzene-4,3-disulfonic acid, or of
(b) 4'-(4"-amino-3"-methylbenzoylamino)-1,1'-azobenzene-4,3'-disulfonic acid, or of
(c) 4' - (3" - amino - 4" - methoxybenzoylamino) - 1,1'-azobenzene-4,3'-disulfonic acid, or of
(d) 4' - (4" - amino - 3" - chlorobenzoylamino) - 1,1'-azobenzene-4,3'-disulfonic acid.

The dyestuffs in cases (a) to (d) correspond respectively to the following formulae

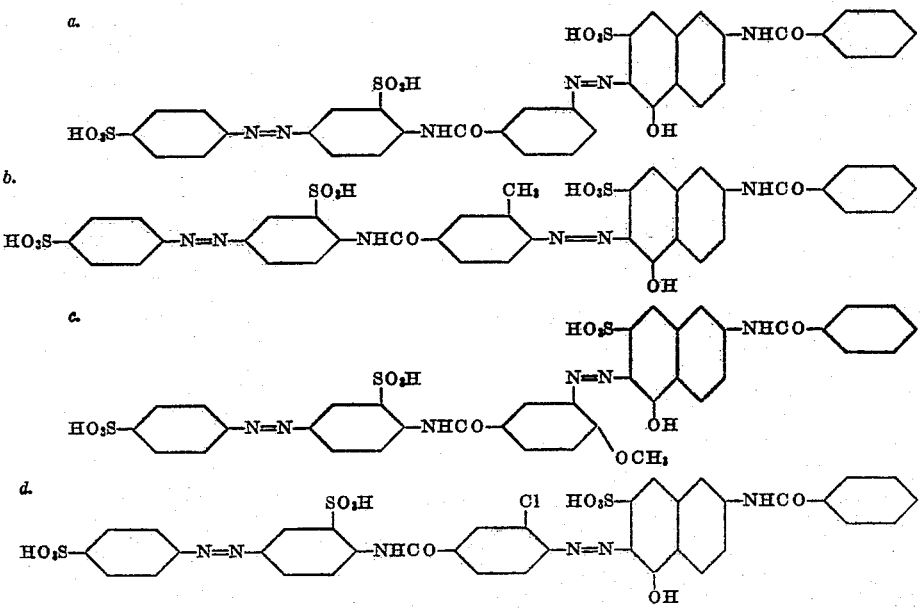

Also similar dyestuffs are obtained by replacing the 4' - (4" - aminobenzoylamino) - 1,1' - azobenzene - 4,3'-disulfonic acid by 4'-(4"-amino-3"-bromobenzoylamino)-1,1'-azobenzene-4,3'-disulfonic acid or by 4'-(3"-amino-4" - bromobenzoylamino) - 1,1' - azobenzene - 4,3' - disulfonic acid or by 4'-(3"-amino-4"-ethoxybenzoylamino)-1,1'-azobenzene-4,3'-disulfonic acid.

*Example 2*

If the 34.3 parts of 2-benzoylamino-5-hydroxynaphthalene-7-sulfonic acid of Example 1 are replaced by 31.5 parts of 2-phenylamino-5-hydroxynaphthalene-7-sulfonic acid, while otherwise following the procedure described in the first paragraph of the said example, a dyestuff is obtained which, in the dry state, is a red-brown powder and dyes cotton and fibers of regenerated cellulose in red-brown shades of good dischargeability and good fastness to light. It corresponds to the formula

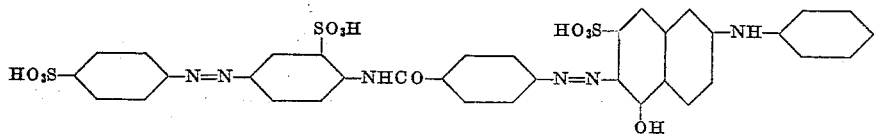

Similar dyestuffs are obtained when, while otherwise proceeding according to the preceding paragraph, the 31.5 parts of 2-phenylamino-5-hydroxynaphthalene-7-sulfonic acid are replaced by 34.5 parts of 2-(4'-methoxyphenylamino)-5-hydroxynaphthalene-7-sulfonic acid or by 31.5 parts of 2-phenylamino-8-hydroxynaphthalene-6-sulfonic acid or by 23.1 parts of 5,5'-dihydroxy-2,2'-dinaphthylamine-7,7'disulfonic acid. The dyestuff in the latter case corresponds to the following formula

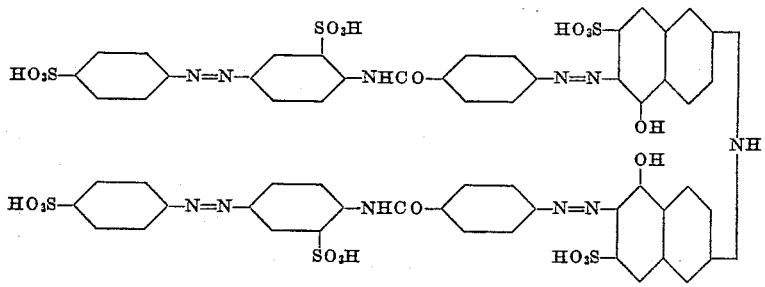

Example 3

49.0 parts of 4'-(4''-amino-3''-methylbenzoylamino)-1,1'-azobenzene-4,3'-disulfonic acid are dissolved in a solution of 8 parts of sodium hydroxide in 300 parts of water, and then 7 parts of sodium nitrite are added to the solution. The solution is slowly introduced into a mixture of 45 parts of hydrochloric acid of 30% strength and 100 parts of ice in such manner that the final temperature of the mixture is 5–10°. When the diazotization is finished, the diazo suspension is run within a period of 30 minutes into a neutral solution of 37.2 parts of 2-(4'-amino-3'-methylbenzoylamino)-5-hydroxynaphthalene-7-sulfonic acid and 4 parts of sodium hydroxide in 300 parts of water. At the same time, sufficient sodium bicarbonate is added to constantly maintain the pH-value of the solution within the range 6.5 and 7.0. When the coupling is finished, the disazo dyestuff solution is heated to 70° and the dyestuff is salted out, filtered off and dried.

It corresponds to the formula

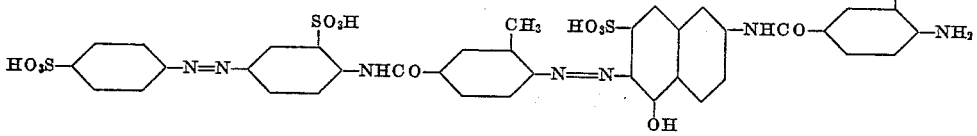

is a dark-red powder, and dyes cotton and fibers of regenerated cellulose in bright scarlet-red shades. By diazotization on the fiber and development with 2-hydroxynaphthalene, the shade becomes redder. The developed dyeings possess a very good fastness to washing and a good fastness to light; they are excellently dischargeable.

Dyestuffs with similar properties are obtained when, while otherwise proceeding as described in this example, the 4'-(4''-amino-3''-methylbenzoylamino)-1,1'-azobenzene-4,3'-disulfonic acid is, on the one hand, replaced by an equivalent quantity of 4'-(4''-aminobenzoylamino)-1,1'-azobenzene-4,3'-disulfonic acid or of 4'-(3''-aminobenzoylamino)-1,1'-azobenzene-4,3'-disulfonic acid or of 4' - (4'' - amino - 3'' - chlorobenzoylamino) - 1,1' - azobenzene-4,3'-disulfonic acid and/or, on the other hand, the 2-(4'-amino-3'-methylbenzoylamino)-5-hydroxynaphthalene-7-sulfonic acid is replaced by an equivalent quantity of 2 - (4' - aminobenzoylamino) - 5 - hydroxynaphthalene-7-sulfonic acid or of 2-(4'-aminobenzoylamino)-8-hydroxynaphthalene-6-sulfonic acid or of 2-(3'-aminobenzoylamino)-5-hydroxynaphthalene-7-sulfonic acid or of 2-[3'-(3''-aminobenzoylamino)-benzoylamino]-5-hydroxynaphthalene-7-sulfonic acid or 2-(3'-amino-4-methoxybenzoylamino)-5-hydroxynaphthalene-7-sulfonic acid. The dyestuff prepared from the diazo compound from 4' - (4'' - aminobenzoylamino) - 1,1 - azobenzene - 4,3'-disulfonic acid and 2-(4'-aminobenzoylamino)-5-hydroxynaphthalene-7-sulfonic acid corresponds to the formula

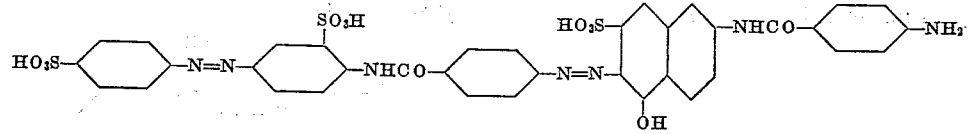

Example 4

47.6 parts of 4' - (4'' - aminobenzoylamino)-1,1'-azobenzene-4,3'-disulfonic acid are dissolved in 250 parts of water with addition of sodium hydroxide, followed by addition of 7 parts of sodium nitrite. The solution is introduced slowly into a mixture of 45 parts of hydrochloric acid of 30% strength and 100 parts of ice in such manner that the final temperature of the mixture is 5–10°. When the diazotization is complete, which generally requires about 3 hours, the diazo suspension is run within a period of 30 minutes into a neutral solution of 21.9 parts of 1-(3'-aminophenyl)-5-pyrazolone-

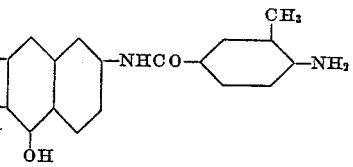

3-carboxylic acid in 200 parts of water and 4 parts of sodium hydroxide. The reaction is kept constantly alkaline by the addition of sodium carbonate solution. When the coupling is finished, the new disazo dyestuff is salted out at 70°, filtered off and dried. It corresponds to the formula

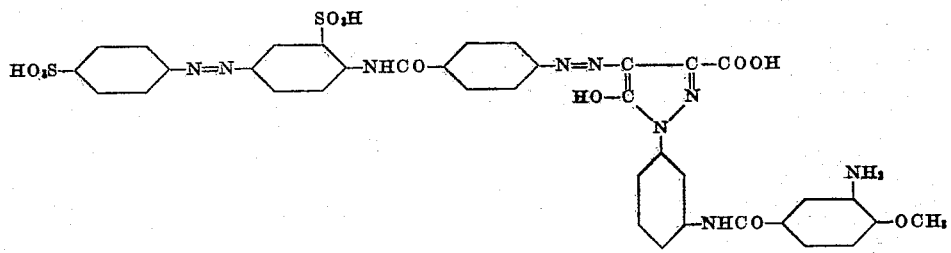

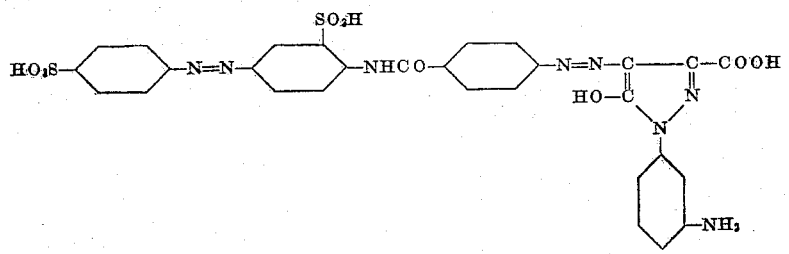

and is a yellow powder which colors cotton and fibers from regenerated cellulose in brilliant yellow shades.

By diazotization on the fiber and development with 1 - phenyl - 3 - methyl - 5 - pyrazolone or 2 - hydroxynaphthalene, yellow to orange-yellow shades of good fastness to washing and good dischargeability are obtained.

Similar dyestuffs are obtained when, while otherwise proceeding as described in this example, the 1-(3'-aminophenyl)-5-pyrazolone-3-carboxylic acid is replaced by an equivalent quantity of 1-(3'-aminophenyl)-3-methyl-5-pyrazolone or of 1-(4'-aminophenyl)-3-methyl-5-pyrazolone or of 1-[3'-(3"-aminobenzoylamino) - phenyl] - 5-pyrazolone-3-carboxylic acid or of 1-[3'-(3"-amino-4"-methoxybenzoylamino) - phenyl] - 5 - pyrazolone - 3-carboxylic acid. The latter two resultant dyestuffs correspond respectively to the formulae and Non-diazotizable, but nevertheless valuable disazo dyestuffs are obtained when, while otherwise proceeding as described in the first paragraph of this example, the 1-(3'-aminophenyl) - 5 - pyrazolone - 3 - carboxylic acid is replaced by an equivalent quantity of 1-phenyl-5-pyrazolone-3-carboxylic acid or of 1-(4'-sulfophenyl)-3-methyl-5-pyrazolone, or of 1-phenyl-3-methyl-5-pyrazolone, or of 1 - (4' - hydroxy - 3' - carboxyphenyl) - 3 - methyl - 5-pyrazolone. In the latter two cases, the resultant dyestuff corresponds to the formulae

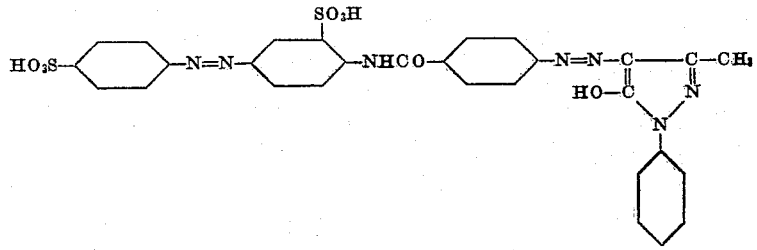

and

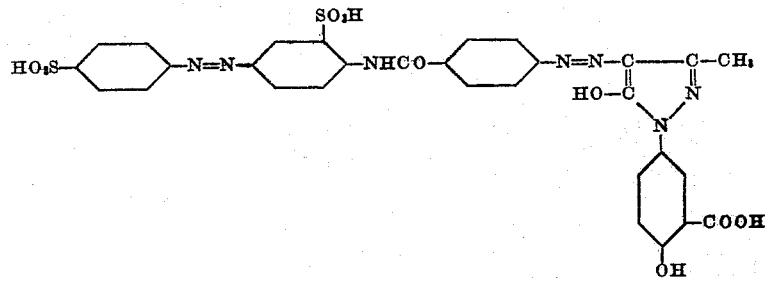

respectively.

*Example 5*

100 parts of cotton are introduced at 80° into a dyebath containing 1 part of sodium carbonate and 0.5 part of the dyestuff according to Example 3, first formula, in 3 liters of water. The dyebath is slowly brought to

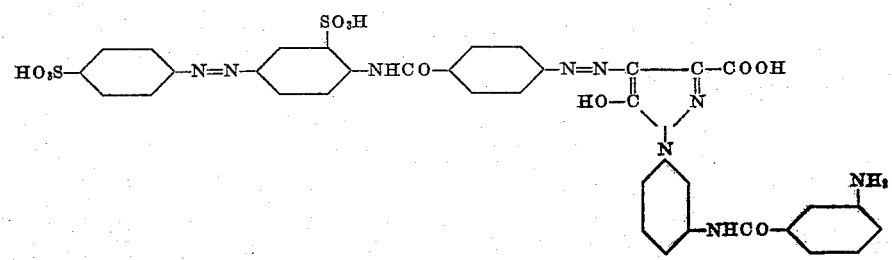

the boil, then 20 parts of sodium sulfate are added and the bath allowed to cool slowly to a temperature of 70°. The dyed material is rinsed with cold water and treated for a half hour in a cold bath with 2 parts of sodium nitrite and 5 parts of concentrated hydrochloric acid. The dyed material is then briefly rinsed with cold water and introduced into a developing bath containing 1 part of 2-hydroxynaphthalene and 1 part of sodium hydroxide solution of 30% strength. The material is treated for a half hour and is then thoroughly rinsed. The thus obtained scarlet-red dyeing is of very good fastness to washing and to light and of excellent dischargeability.

*Example 6*

100 parts of cotton are introduced at 80° into a dyebath containing 1 part of sodium carbonate and 0.5 part of the dyestuff according to Example 1, first formula, in 3 liters of water. The dyebath is slowly brought to the boil, then 20 parts of sodium sulfate are added and the bath allowed to cool slowly to a temperautre of 70°. The thus obtained red-orange dyeing is of very good fastness to washing and to light and of excellent dischargeability.

No difference is seen with regard to the dischargeability of the dyeings if the dyestuff of Example 1, first formula, is replaced by any one corresponding to the general Formula 1, wherein R denotes any one of the residue of the Formulae 2.

Having thus disclosed the invention what is claimed is:

1. A disazo dyestuff corresponding to the formula

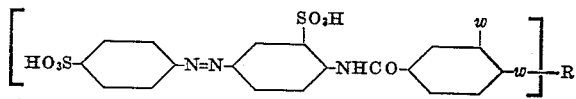

wherein one $w$ stands for a —N=N— group, the other $w$ being a member selected from the group consisting of a hydrogen atom, a halogen atom, a lower alkyl group and a lower alkoxy group, and wherein R stands for a radical selected from the class consisting of

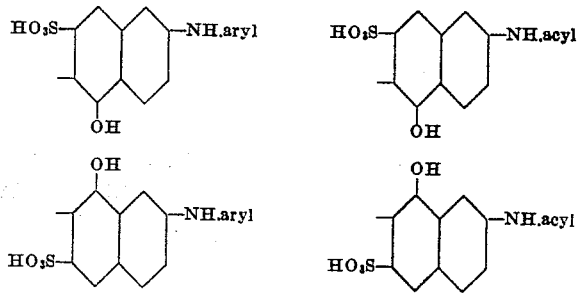

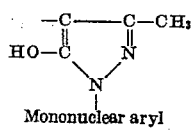

Mononuclear aryl and

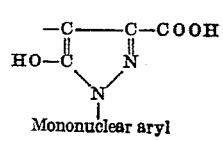

Mononuclear aryl

2. The disazo dyestuff corresponding to the formula

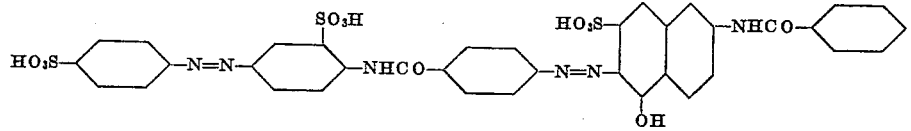

3. The disazo dyestuff corresponding to the formula

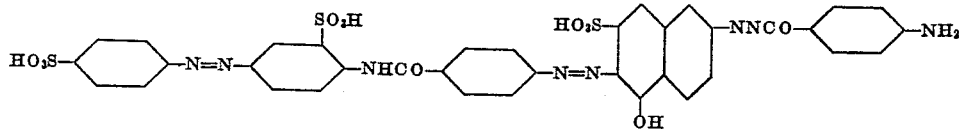

4. The disazo dyestuff corresponding to the formula

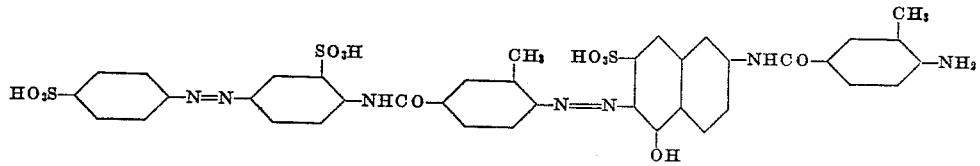

5. The disazo dyestuff corresponding to the formula

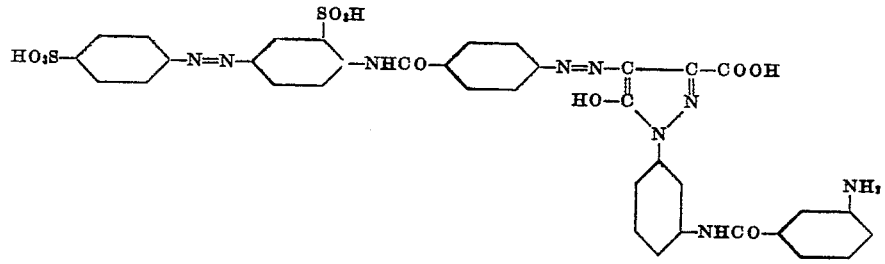

6. The disazo dyestuff corresponding to the formula
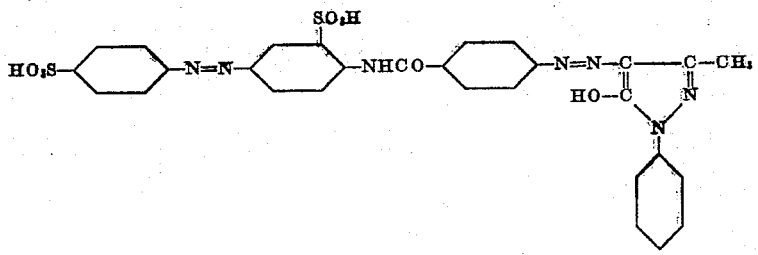
References Cited in the file of this patent
UNITED STATES PATENTS
| | | |
|---|---|---|
| 1,739,031 | Hitch et al. | Dec. 10, 1929 |
| 2,127,986 | Roos | Aug. 23, 1938 |
FOREIGN PATENTS
| | | |
|---|---|---|
| 419,736 | Great Britain | Nov. 19, 1934 |